US00RE45837E

(19) United States
(12) Reissued Patent
Krueger

(10) Patent Number: US RE45,837 E
(45) Date of Reissued Patent: Jan. 12, 2016

(54) SCREW-ON ANT MOAT FOR A BIRD FEEDER

(71) Applicant: Classic Brands, LLC, Denver, CO (US)

(72) Inventor: Bryan Krueger, Denver, CO (US)

(73) Assignee: Classic Brands, LLC, Denver, CO (US)

(21) Appl. No.: 29/485,999

(22) Filed: Mar. 25, 2014

Related U.S. Patent Documents

Reissue of:
(64) Patent No.: Des. 682,481
Issued: May 14, 2013
Appl. No.: 29/416,885
Filed: Mar. 28, 2012

(51) LOC (10) Cl. ..... 30-03
(52) U.S. Cl.
USPC ..... D30/124
(58) Field of Classification Search
USPC ..... D30/121, 122, 124–133; 119/61.5, 119/51.01, 61.56, 51.03, 59, 62, 63, 51.5, 119/57.8, 74, 61.54, 61.55; D9/434, 435, D9/428; D22/120; D10/116; D23/260; D8/382, 373
See application file for complete search history.

(56) References Cited

U.S. PATENT DOCUMENTS

| | | | | | |
|---|---|---|---|---|---|
| 15,982 | A | | 10/1856 | Moulton | |
| D3,585 | S | | 7/1869 | Brown | |
| D4,451 | S | | 11/1870 | Pitts | |
| D7,964 | S | | 12/1874 | Morse | |
| D8,908 | S | | 1/1876 | Wiley | |
| D22,607 | S | | 7/1893 | Johnes | |
| D24,947 | S | | 12/1895 | Feeny et al. | |
| D28,734 | S | | 5/1898 | Muller | |
| 721,435 | A | | 2/1903 | Fielding | |
| D36,459 | S | | 7/1903 | Brosi | |
| 1,010,543 | A | * | 12/1911 | Walter et al. | 119/77 |
| 1,023,240 | A | | 4/1912 | Bowier | |
| 1,091,392 | A | | 3/1914 | Schlichtinger | |
| 1,107,206 | A | | 8/1914 | Schwartzburg | |
| 1,136,092 | A | | 4/1915 | Blumere | |
| 1,148,873 | A | | 8/1915 | Stocking | |
| 1,181,045 | A | | 4/1916 | Tessier | |
| 1,265,481 | A | | 5/1918 | Mosby | |
| 1,377,111 | A | | 5/1921 | Blair | |
| 1,391,353 | A | * | 9/1921 | Wells | 47/71 |
| 1,423,547 | A | | 7/1922 | Strohbach | |

(Continued)

OTHER PUBLICATIONS

Restriction Requirement, Design U.S. Appl. No. 29/480,509, mailed Sep. 30, 2014, 5 pages.

(Continued)

*Primary Examiner* — Phillip S Hyder
(74) *Attorney, Agent, or Firm* — Polsinelli PC

(57) CLAIM

The ornamental design for a screw-on ant moat for a bird feeder, as shown and described.

DESCRIPTION

FIG. 1 is a front perspective view of a screw-on ant moat for a bird feeder embodying my new design.
FIG. 2 is a right side view thereof, the left side and back views being substantially the same.
FIG. 3. is a top view thereof.
FIG. 4. is a bottom view thereof; and,
FIG. 5 is a bottom perspective view thereof.
[The portion shown in broken lines in FIG. 4 is environment only, and forms no part of my claimed design.]
*The broken lines depict portions of the screw-on ant moat for a bird feeder in which the design is embodied that are not considered part of the claimed design.*

1 Claim, 5 Drawing Sheets

Figure 2:
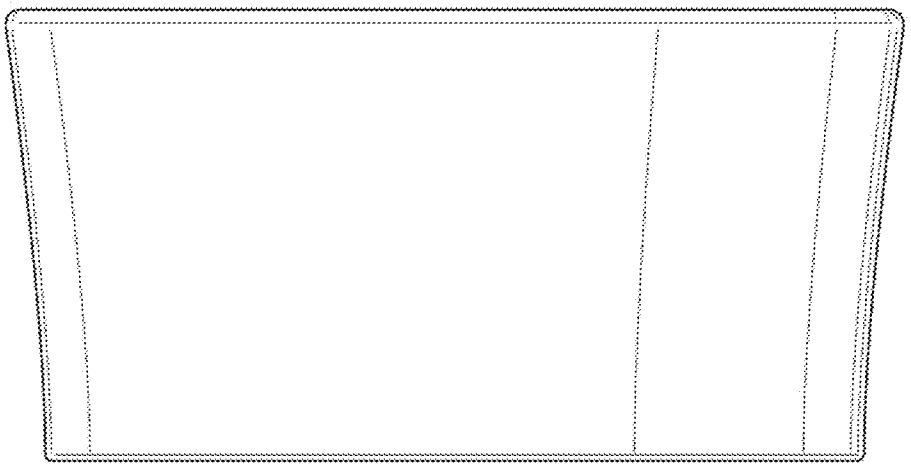
Figure 4:
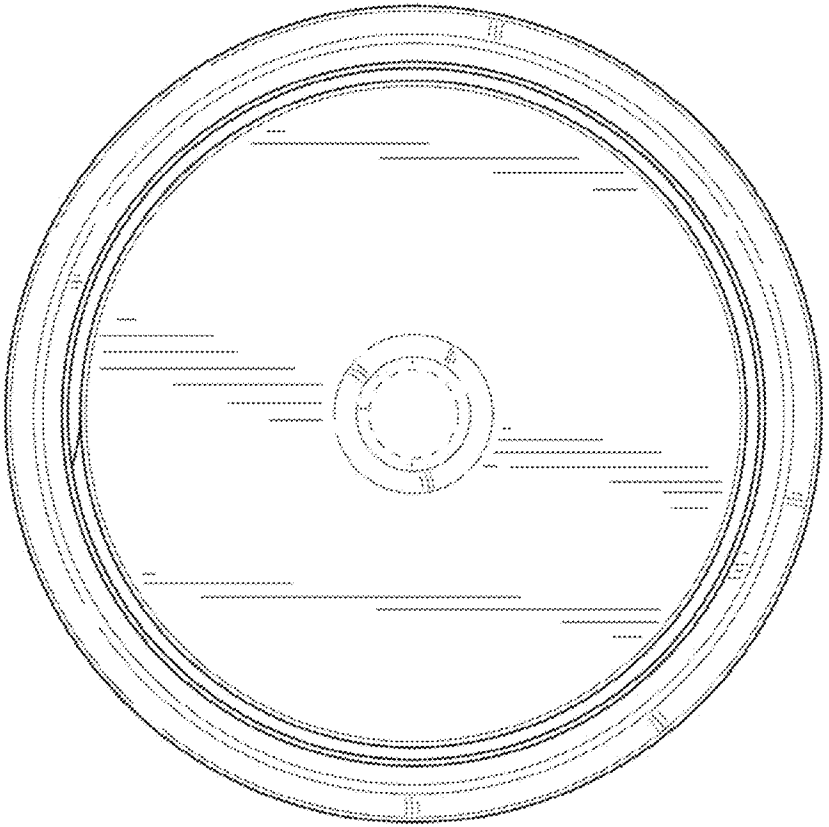
Figure 5:
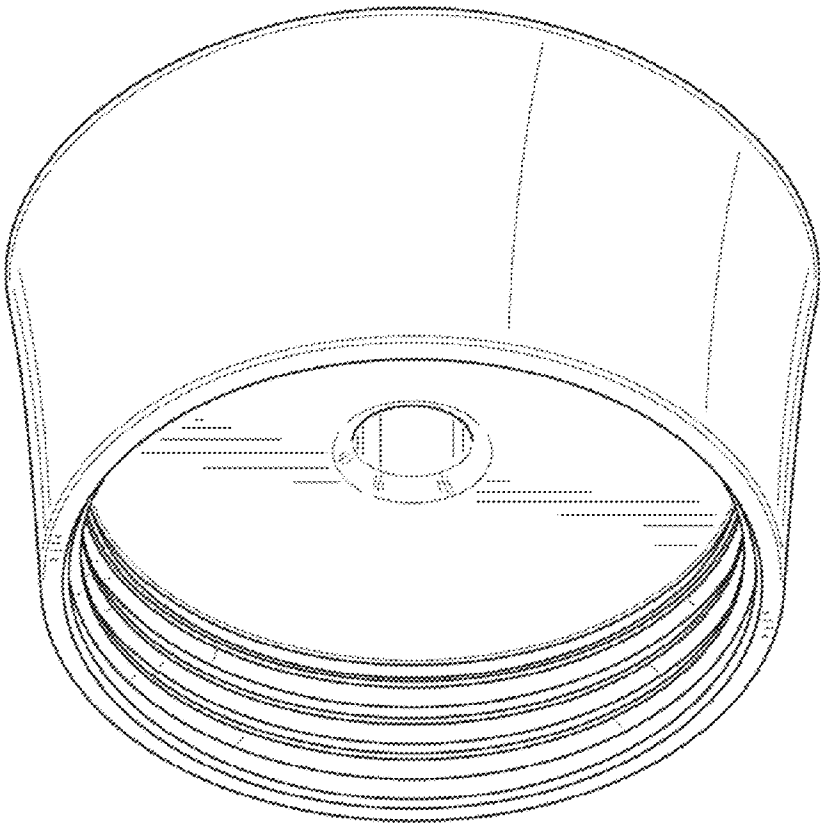

Matter enclosed in heavy brackets [ ] appears in the original patent but forms no part of this reissue; matter printed in italics indicates the additions made by reissue.

AMENDED

(56) References Cited

U.S. PATENT DOCUMENTS 1,426,508 A 8/1922 Rollins
1,434,831 A 11/1922 Long
D62,916 S 8/1923 Peck
1,472,667 A 10/1923 Nelson
1,521,782 A 1/1925 Meier
1,538,480 A 5/1925 Gallagher
1,555,407 A * 9/1925 Ferris ..... 222/586
1,557,068 A 10/1925 Lee
1,566,571 A * 12/1925 Appleton ..... 119/77
D71,107 S 9/1926 Gorowitz
1,623,439 A 4/1927 Rawlings
1,634,648 A 7/1927 Cardinet
1,644,063 A 10/1927 Kircher
D76,001 S 8/1928 Broch
1,682,575 A 8/1928 Leon et al.
D81,960 S 9/1930 Dickson
D84,104 S 5/1931 Rithner
1,858,087 A 5/1932 Howard
1,864,200 A 6/1932 Kaufmann
D95,019 S 4/1935 Cooperstein
2,000,609 A 5/1935 Pitman
D105,812 S * 8/1937 Siekert ..... D30/130
D121,675 S 7/1940 Goldin
D126,997 S * 5/1941 Bentzen et al. ..... D30/129
D130,923 S 12/1941 Philipovich
2,267,883 A * 12/1941 Wood ..... 119/77
D132,522 S 5/1942 Fuerst et al.
D140,392 S 2/1945 Haynes
2,432,632 A 12/1947 Seibel
D149,729 S 5/1948 Aronek
2,475,207 A 7/1949 Smith
2,570,733 A 10/1951 Thomas
D165,628 S * 1/1952 Blazier ..... D30/128
2,641,086 A 6/1953 Stephen
2,652,027 A 9/1953 Coyner
D174,909 S 6/1955 Kllegberg
D175,435 S 8/1955 Moffat
2,801,611 A 8/1957 Decker
3,050,619 A 8/1962 Abramson
D194,846 S 3/1963 Perry
3,089,605 A 5/1963 Buonauro
D196,777 S * 11/1963 Haynes ..... D30/132
3,125,069 A 3/1964 Fowler
D200,472 S 3/1965 Chang
3,244,150 A 4/1966 Benton
D205,772 S 9/1966 Blair
3,272,467 A 9/1966 Kassube
3,307,602 A 3/1967 Boster
D214,172 S 5/1969 Troutman
3,491,724 A * 1/1970 Sunner ..... 119/61.54
3,634,678 A 1/1972 Glass et al.
3,661,122 A 5/1972 Willauer, Jr.
D234,615 S 3/1975 Kilham
D236,139 S 7/1975 Kilham
3,901,192 A * 8/1975 Adams ..... 119/57.9
3,913,527 A 10/1975 Kilham
3,928,936 A 12/1975 Wollen
D239,182 S 3/1976 Kilham
D241,149 S * 8/1976 Miller et al. ..... D30/128
3,979,854 A 9/1976 Perkins
3,997,999 A 12/1976 Evans
D244,098 S 4/1977 Kilham
D244,786 S 6/1977 Dryden
4,030,451 A * 6/1977 Miller ..... 119/57.9
4,037,361 A 7/1977 Murphy et al.
D246,294 S 11/1977 Hetherington
4,082,872 A 4/1978 Hughes
4,085,706 A * 4/1978 Evans ..... 119/61.54
D248,006 S 5/1978 Christian
4,096,947 A 6/1978 Morse
4,102,308 A 7/1978 Kilham
D252,288 S 7/1979 Kilham
D253,706 S 12/1979 Bardeau
4,206,529 A 6/1980 Neumann
4,361,116 A 11/1982 Kilham
4,369,216 A 1/1983 Willinger
4,395,015 A * 7/1983 Reardon ..... 249/115
D271,434 S * 11/1983 Love ..... D30/128
D273,429 S * 4/1984 Kilham ..... D30/128
4,441,458 A 4/1984 Mercil
D277,703 S * 2/1985 Kilham ..... D30/128
D277,988 S * 3/1985 Kilham ..... D30/121
4,516,533 A 5/1985 Mallinson
D280,559 S * 9/1985 Bentall ..... D30/128
D281,768 S 12/1985 Hansen, Jr.
4,588,618 A 5/1986 Wolfe
D285,840 S 9/1986 Poon
D287,652 S 1/1987 Mack
D288,353 S 2/1987 Smith
4,691,665 A 9/1987 Hefner
4,708,892 A 11/1987 Young et al.
4,789,572 A 12/1988 Weaver
4,803,954 A 2/1989 Welch et al.
D304,536 S * 11/1989 Blaser ..... D7/584
D309,639 S 7/1990 Knudsen
D309,640 S 7/1990 Knudsen
D314,253 S * 1/1991 Goetz ..... D30/129
5,016,791 A 5/1991 Burow
5,062,390 A 11/1991 Bescherer et al.
D322,044 S 12/1991 Marsar et al.
5,083,881 A 1/1992 Yoshinaga
5,088,615 A 2/1992 Neuman
5,101,996 A 4/1992 Mosley
D326,003 S * 5/1992 Embree ..... D30/128
D331,647 S 12/1992 Embree
D331,864 S 12/1992 Sciubba
D333,538 S * 2/1993 Kingsley ..... D30/199
5,183,005 A 2/1993 Tyler
5,195,463 A * 3/1993 Lorenzana et al. ..... 119/77
5,207,180 A 5/1993 Graham
5,215,040 A 6/1993 Lemley
D343,030 S 1/1994 Harwick, Jr.
D345,444 S 3/1994 Kestekides-Kesdekoglu
D347,714 S 6/1994 Maple et al.
5,396,878 A 3/1995 Quist
D360,710 S 7/1995 Colwell
5,450,816 A 9/1995 Santa Cruz
D365,411 S 12/1995 Yan
D368,337 S 3/1996 Dickinson
D368,347 S 3/1996 Kruger
D368,989 S 4/1996 Prehart
5,507,249 A 4/1996 Shaw
5,522,758 A 6/1996 Liu
D371,401 S 7/1996 Nielsen et al.
D371,838 S 7/1996 Davis et al.
5,564,226 A * 10/1996 Paramest ..... 47/71
D376,453 S 12/1996 Park
D378,312 S 3/1997 Davis, Jr.
5,638,638 A * 6/1997 Moskowitz ..... 47/71
D382,376 S 8/1997 Bescherer
5,678,600 A 10/1997 Locke et al.
D386,811 S 11/1997 Milicia
5,682,835 A 11/1997 Walter
D387,156 S 12/1997 Johnson
D388,235 S 12/1997 Wilson et al.
D392,763 S 3/1998 Denison
D394,468 S 5/1998 Leadbetter
D397,529 S 8/1998 Fuller et al.
5,800,047 A 9/1998 Yang
5,806,460 A 9/1998 Klein
5,816,686 A 10/1998 Wang et al.
5,823,135 A 10/1998 Gilchrist et al.
5,845,605 A * 12/1998 Malamphy ..... 119/69.5
5,848,493 A 12/1998 Gasper
5,881,671 A 3/1999 Riedl
5,899,555 A 5/1999 Lin
D412,226 S * 7/1999 Bellehumeur ..... D30/130
5,918,415 A 7/1999 Locke et al.
5,947,054 A 9/1999 Liethen
D417,528 S 12/1999 Rizzo
6,012,414 A 1/2000 Klein
D421,643 S 3/2000 Mauk
D429,852 S 8/2000 Hogarty
D433,747 S 11/2000 Frampton

(56) References Cited

U.S. PATENT DOCUMENTS 6,145,477 A 11/2000 Jansen
D438,360 S 2/2001 Robinson
D440,002 S 4/2001 Miranda
D440,677 S 4/2001 Long et al.
D443,711 S 6/2001 Lindsay
D445,525 S 7/2001 Pan
D445,533 S 7/2001 Arnoldo
D445,939 S 7/2001 Pan
D450,786 S 11/2001 Jenkins et al.
D451,997 S 12/2001 Schwartz
D454,192 S 3/2002 Frampton
D454,636 S 3/2002 Lantz
D454,669 S 3/2002 Lieb
D455,599 S 4/2002 Cheng
D459,824 S 7/2002 Leen
6,439,158 B1 8/2002 Blohm
6,463,878 B1 10/2002 Moody
6,499,430 B2 12/2002 Garcia-Lucio et al.
D470,621 S 2/2003 Cheng
D473,739 S 4/2003 Lenger
D476,755 S 7/2003 LoVullo et al.
D478,475 S 8/2003 Backes et al.
D479,595 S 9/2003 Curtin
D479,596 S 9/2003 Curtin
D479,597 S 9/2003 Curtin
D480,135 S 9/2003 Frampton
D480,802 S 10/2003 Frampton
D480,803 S 10/2003 Frampton
D482,736 S 11/2003 Manville
D483,529 S 12/2003 Fort, II
D483,858 S 12/2003 Lin
6,662,747 B1 12/2003 Wydra
D485,208 S * 1/2004 Fan ..... D11/143
D485,345 S 1/2004 Bucher
D485,350 S 1/2004 Frampton
D485,351 S 1/2004 Frampton
D485,387 S 1/2004 Harbaugh
D485,928 S 1/2004 Leung et al.
6,672,249 B2 1/2004 Garcia-Lucio et al.
D488,195 S 4/2004 Manville
D488,219 S 4/2004 Frampton
D489,128 S 4/2004 Frampton
6,733,151 B2 5/2004 Shu
D490,745 S * 6/2004 Fan ..... D11/143
D491,657 S 6/2004 Cartwright
6,776,511 B1 8/2004 Lindsay
D495,839 S 9/2004 Muday et al.
D502,293 S 2/2005 Harger
D502,294 S * 2/2005 Hung ..... D30/129
6,860,229 B1 * 3/2005 Craft ..... 119/61.5
6,861,108 B1 3/2005 Potoroka, Sr.
D504,987 S 5/2005 Morris, Sr.
6,890,155 B2 5/2005 Cartwright
D506,826 S 6/2005 Frampton
D509,325 S 9/2005 Jung et al. ..... D30/127
D510,992 S 10/2005 Bucher
D511,074 S 11/2005 Claypool et al.
D514,749 S 2/2006 Fort et al.
D516,712 S 3/2006 Pickett
D521,194 S 5/2006 Weiland
7,040,251 B2 5/2006 Fort, II
D523,955 S 6/2006 Badarello
D524,490 S 7/2006 Obenshain
D525,903 S 8/2006 Weiser et al.
D529,220 S 9/2006 Izardel
D530,457 S 10/2006 Jung et al.
D532,132 S 11/2006 Holsinger et al.
D536,838 S 2/2007 Colvin et al.
D538,485 S 3/2007 Degironne
D541,466 S 4/2007 Bucher et al.
D542,479 S 5/2007 O'Dell
D543,665 S * 5/2007 Hewitt et al. ..... D30/129
7,234,418 B2 6/2007 Fort et al.
D545,984 S 7/2007 Leung et al.
D546,991 S 7/2007 Poon
D548,321 S 8/2007 Orozco
D554,252 S 10/2007 Bucher et al.
D559,472 S * 1/2008 Abinanti et al. ..... D30/129
D561,021 S 2/2008 DuVal et al.
D563,608 S * 3/2008 Kitchen ..... D30/129
D563,616 S 3/2008 Lynde et al.
D565,173 S 3/2008 Bucher et al.
D569,301 S 5/2008 Fotherby
7,396,212 B1 7/2008 Parker et al.
D575,864 S 8/2008 Parker et al.
7,448,347 B2 11/2008 Richmond
D583,187 S 12/2008 Rapaz
D584,387 S 1/2009 Lee et al.
D585,625 S 1/2009 Gray
D588,756 S 3/2009 Colvin et al.
7,506,611 B1 3/2009 Lush
D593,649 S 6/2009 Marvell
D595,525 S 7/2009 Dimond
D597,197 S 7/2009 Parker et al.
D598,238 S 8/2009 Durdon et al.
D600,861 S * 9/2009 Sin ..... D30/129
D601,309 S * 9/2009 Babal ..... D30/129
7,600,487 B2 10/2009 Stone et al.
D604,436 S 11/2009 Poon
D606,708 S 12/2009 McMullen
D606,709 S 12/2009 McMullen
D606,878 S 12/2009 Lindfors
D609,329 S 2/2010 Parker et al.
D612,549 S 3/2010 Garcia-Lucio et al.
7,685,969 B2 3/2010 Stone et al.
D614,825 S 4/2010 Biegel
D615,310 S 5/2010 Cybulski
D620,172 S 7/2010 Orozco
D623,005 S 9/2010 Cheng
D623,806 S * 9/2010 Modi et al. ..... D30/129
D624,352 S 9/2010 Lion et al.
7,789,040 B2 9/2010 Liethen
D627,457 S 11/2010 Klausing et al.
D629,137 S 12/2010 Chen
D630,969 S 1/2011 Mattis
7,861,671 B2 1/2011 Carter et al.
7,886,695 B2 2/2011 Held et al.
D633,659 S 3/2011 Lai
D636,539 S * 4/2011 Montoya ..... D30/129
D636,946 S * 4/2011 Able ..... D30/129
D637,448 S 5/2011 Cheng
7,946,249 B2 5/2011 Colvin et al.
D641,516 S 7/2011 Chen
8,011,323 B2 9/2011 Vaughn et al.
8,051,803 B2 11/2011 Gauker et al.
D650,514 S 12/2011 Lin et al.
D652,972 S 1/2012 Lee
D653,011 S 1/2012 Myers
D656,279 S 3/2012 Tu
D658,930 S 5/2012 Munari
D661,434 S 6/2012 Fields et al.
D665,627 S 8/2012 De Winter
D670,042 S 10/2012 Anderson
D670,836 S 11/2012 Hisey et al.
D671,276 S 11/2012 Krueger
8,360,005 B1 1/2013 Allen
D689,730 S 9/2013 Goto et al.
8,899,179 B1 12/2014 Carter et al.
2002/0121246 A1 9/2002 Harman
2004/0010971 A1 1/2004 Redfield et al.
2004/0118354 A1 6/2004 Cox et al.
2004/0134437 A1 7/2004 Fort
2004/0261726 A1 12/2004 Lumpkin
2005/0127074 A1 * 6/2005 Kusuma et al. ..... 220/6
2006/0005774 A1 * 1/2006 Newman Bornhofen .... 119/61.5
2006/0065202 A1 3/2006 Fort et al.
2006/0090391 A1 5/2006 Huang
2006/0090707 A1 5/2006 Donegan
2006/0096545 A1 5/2006 Cone et al.
2006/0117962 A1 6/2006 Hoekstra et al.
2006/0124067 A1 6/2006 Taylor
2007/0108197 A1 5/2007 Richardson et al.
2007/0221133 A1 9/2007 Richmond
2008/0006212 A1 1/2008 Ebert

(56) References Cited

U.S. PATENT DOCUMENTS

| | | | |
|---|---|---|---|
| 2008/0035068 | A1 | 2/2008 | Gou |
| 2008/0244959 | A1 | 10/2008 | Schinazi et al. |
| 2008/0257273 | A1 | 10/2008 | Carter et al. |
| 2008/0302304 | A1 | 12/2008 | Mayfield |
| 2009/0056633 | A1 | 3/2009 | McDaniel et al. |
| 2009/0056636 | A1 | 3/2009 | Deese et al. |
| 2009/0078211 | A1 | 3/2009 | Charlton |
| 2009/0145875 | A1 | 6/2009 | Gardner |
| 2009/0229528 | A1 | 9/2009 | McMurtry |
| 2009/0304876 | A1 | 12/2009 | Weiss |
| 2009/0308321 | A1 | 12/2009 | Szczygiel-Durante |
| 2009/0320765 | A1 | 12/2009 | Gauker et al. |
| 2010/0024738 | A1 | 2/2010 | Chen et al. |
| 2010/0170447 | A1 | 7/2010 | Pridgen, Jr. |
| 2010/0180828 | A1 | 7/2010 | DeMichael |
| 2010/0218754 | A1 | 9/2010 | Kuntz |
| 2010/0224132 | A1 | 9/2010 | Gauker et al. |
| 2011/0011345 | A1 | 1/2011 | LoRocco et al. |
| 2011/0297095 | A1 | 12/2011 | Cruz et al. |
| 2012/0311919 | A1 | 12/2012 | Hardigree |

OTHER PUBLICATIONS

Response to Restriction Requirement, Design U.S. Appl. No. 29/480,509, filed Dec. 1, 2014, 3 pages.
Notice of Allowance, Design U.S. Appl. No. 29/480,509, 27 pages.
Ex Parte Quayle Action, Design U.S. Appl. No. 29/382,076, mailed Mar. 23, 2012, 13 pages.
Response to Ex Parte Quayle Action, Design U.S. Appl. No. 29/382,076, filed May 23, 2012, 9 pages.
Notice of Allowance, Design U.S. Appl. No. 29/382,075, mailed Feb. 1, 2012, 18 pages.
Restriction Requirement, Design U.S. Appl. No. 29/416,890 mailed Aug. 2, 2012, 5 pages.
Response to Restriction Requirement, Design U.S. Appl. No. 29/416,890, filed Sep. 4, 2012, 13 pages.
CPA/Amendment, Design U.S. Appl. No. 29/382,076, filed Sep. 19, 2012, 9 pages.
Duncraft, Inc., JB's Hummingbird Feeder, (date unknown) located at http://www.duncraft.com/JBS-Hummingbird-Feeder, 3 pages, offered for sale no later than Mar. 27, 2012.
Duncraft, Inc., Jewel Hummingbird Feeder, (date unknown) located at http://www.duncraft.com/Jewel-Cut-Hummingbird-Feeder, 2 pages, offered for sale no later than Mar. 27, 2012.
Duncraft, Inc., Lantern Hummingbird Feeder, (date unknown) located at http://www.duncraft.com/index/page/product/product_id/1326/product_name/Lantern+Hummingbird+Feeder, 2 pages, offered for sale no later than Mar. 27, 2012.
Duncraft, Inc., Deluxe Hummer Feeder, (date unknown) located at http://www.duncraft.com/index/page/product/product_id/1020/product_name/Deluxe+Hummer+Feeder, 2 pages, offered for sale no later than Mar. 27, 2012.
Duncraft, Inc., Four Flower Frolic Feeder Set, (date unknown) located at http://www.duncraft.com/Four-Flower-Frolic-Humming-bird-Feeder-Set, 2 pages, offered for sale no later than Mar. 27, 2012.
Duncraft, Inc., Hollyhock Hummingbird Feeder, (date unknown) located at http://www.duncraft.com/Hollyhock-Hummingbird-Feeder, 2 pages, offered for sale no later than Mar. 27, 2012.
U.S. Appl. No. 29/382,076, filed Dec. 29, 2010, Fields et al.
U.S. Appl. No. 29/382,076, filed Dec. 29, 2010, Fields et al., D661,434.
U.S. Appl. No. 29/387,518, filed Mar. 14, 2011, Krueger et al.
U.S. Appl. No. 29/416,890, filed Mar. 28, 2012, Krueger.

* cited by examiner

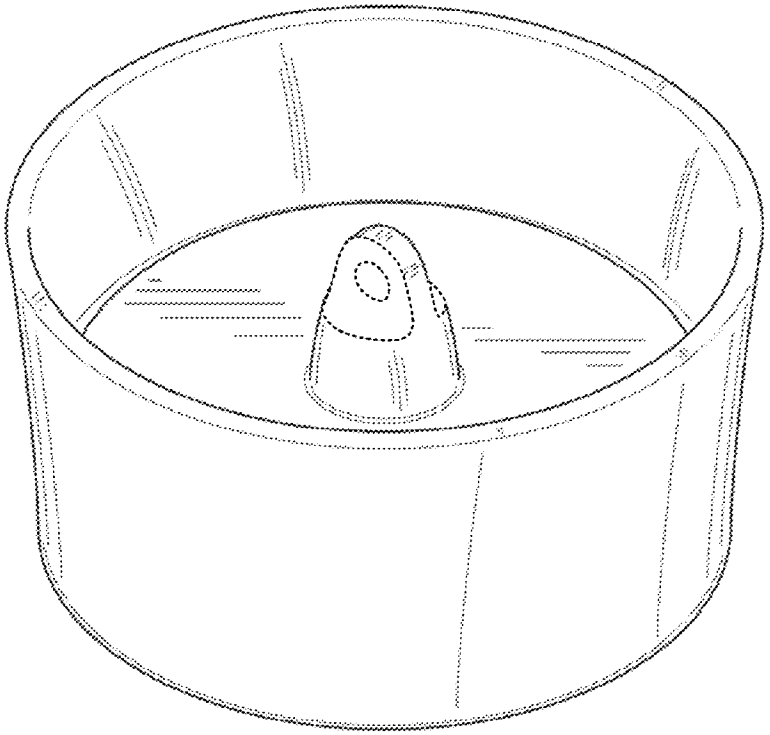
FIG. 1
AMENDED

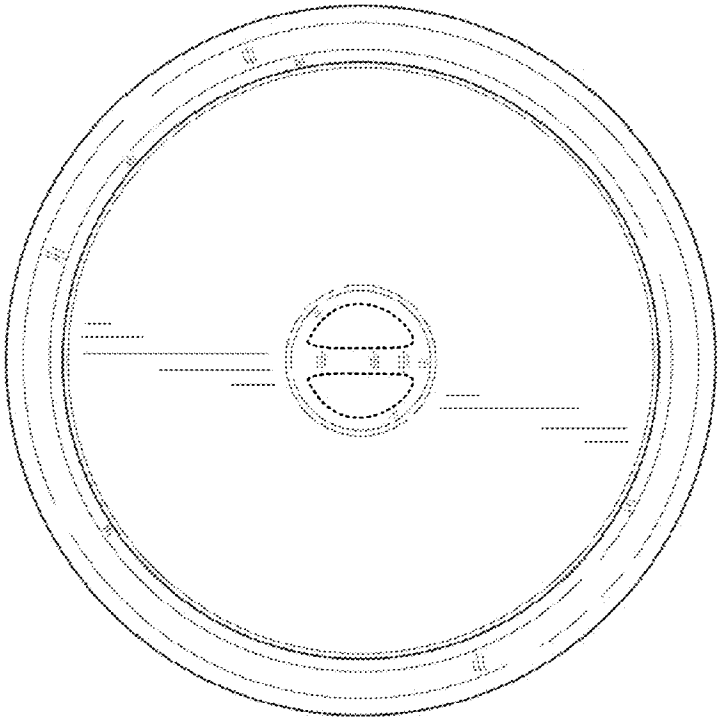
FIG. 3
AMENDED